July 7, 1931.   D. F. CLARKE   1,812,862
INTERNAL COMBUSTION ENGINE
Filed Sept. 17, 1929   2 Sheets-Sheet 1
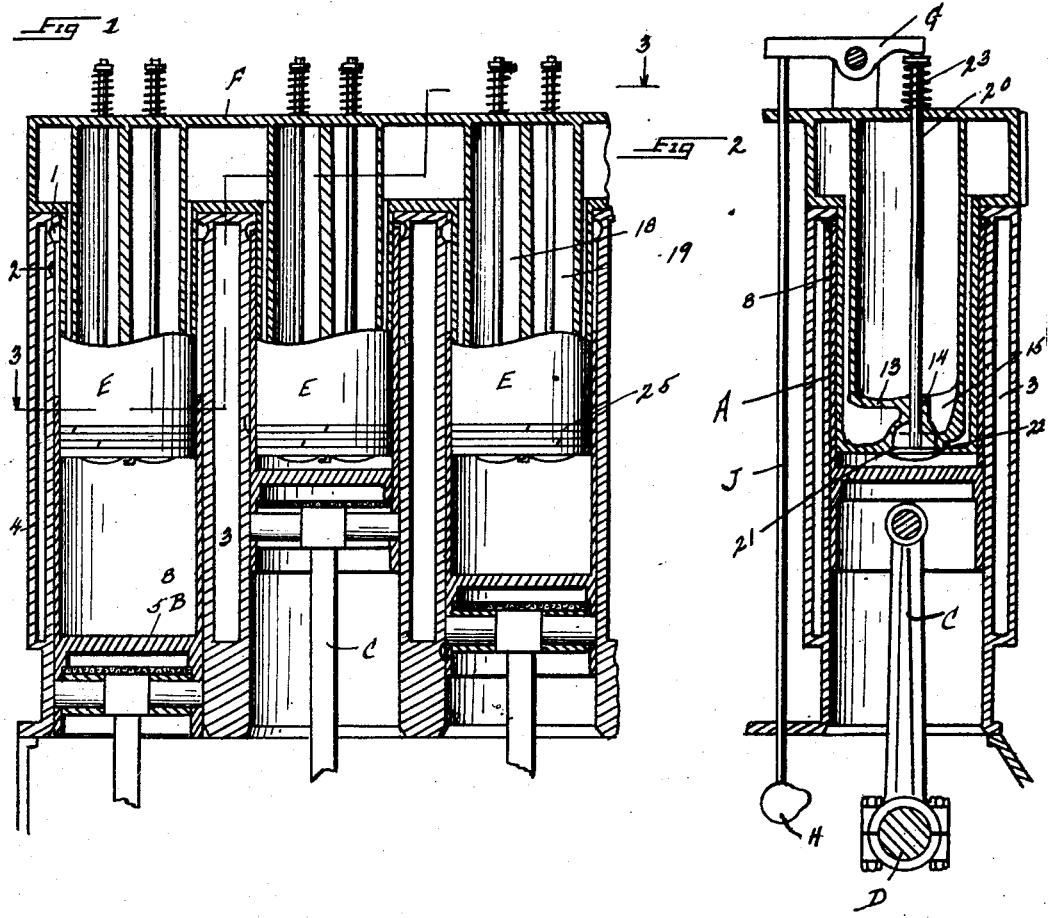
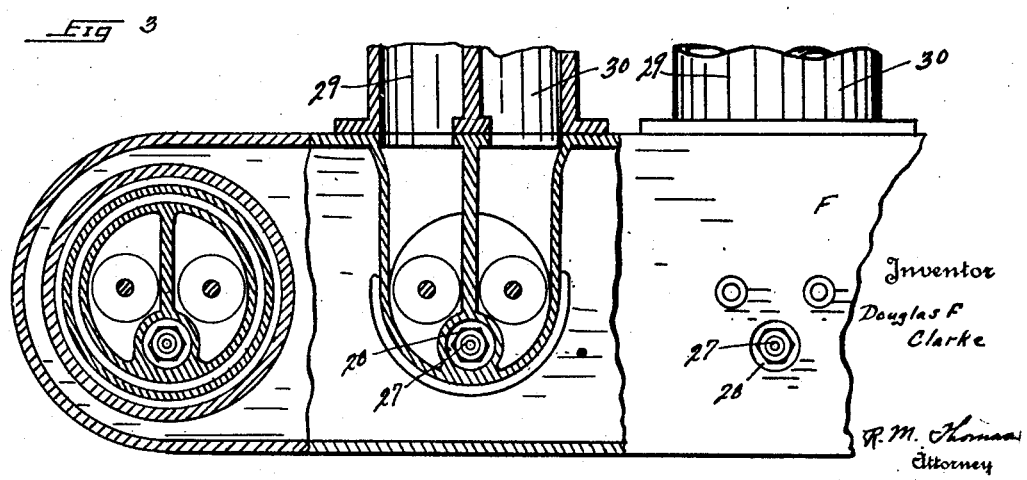
Inventor
Douglas F. Clarke
R. M. Thomas
Attorney

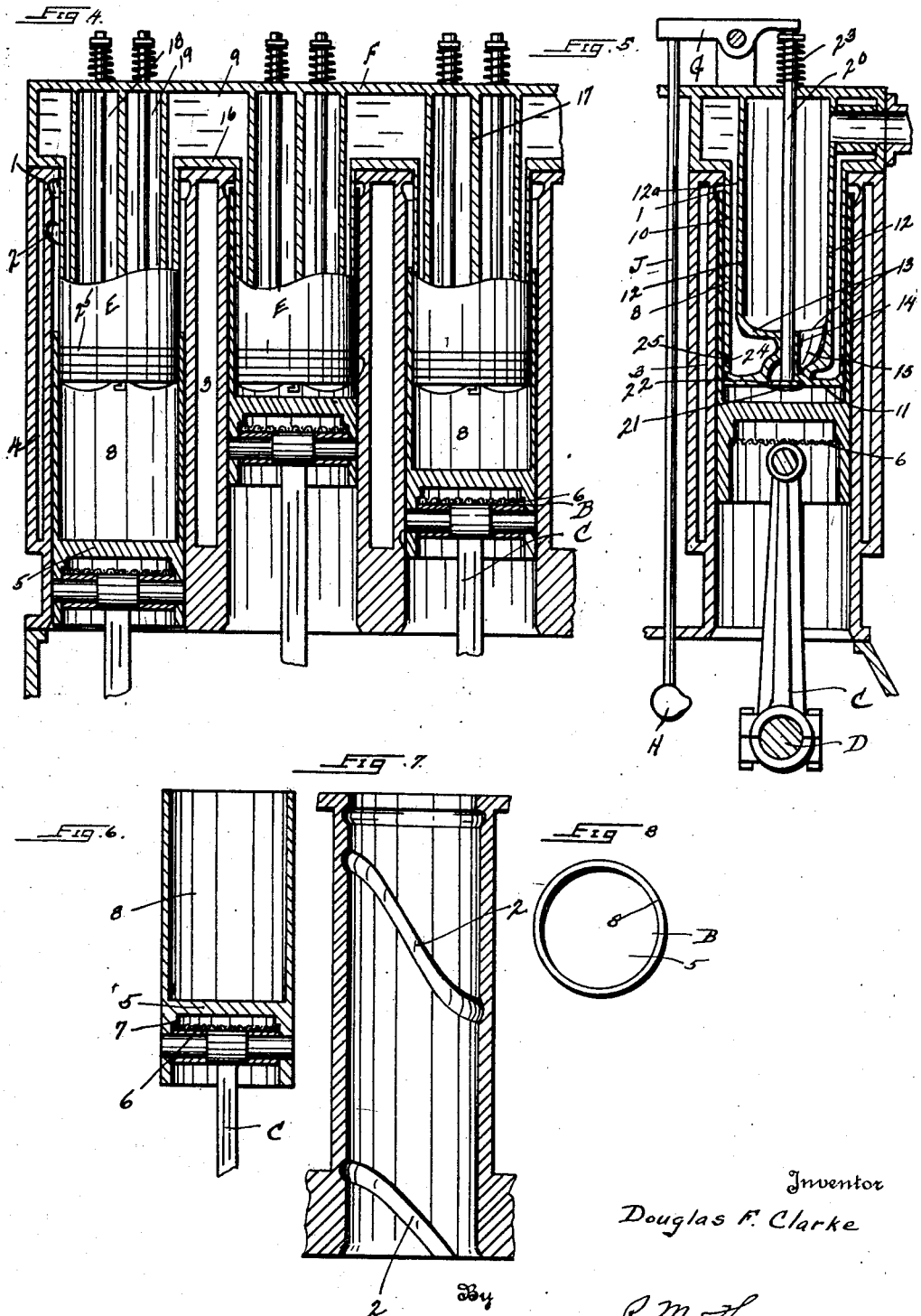

Patented July 7, 1931

1,812,862

UNITED STATES PATENT OFFICE

DOUGLAS F. CLARKE, OF SALT LAKE CITY, UTAH, ASSIGNOR TO AMERICAN MIRACLE MOTORS, LTD., A CORPORATION OF CALIFORNIA

INTERNAL COMBUSTION ENGINE

Application filed September 17, 1929. Serial No. 393,150.

My invention relates to internal combustion engines and has for its object to provide a new and efficient motor which will eliminate dilution of the crank case oils, increase the mileage of the fuel used, and make a cooler running motor.

A further object is to provide a motor which will be water jacketed so as to eliminate much of the carbonization of the gases, one which will have a return flow bleeder in the cylinder walls to drain the splash oils back into the crank case and one which will have a well formed around the top end of the cylinder so that there will be no foreign substances drained down into the crank case.

A still further object is to provide a motor which will have the spark plug set down into a well so as to form a hot spot in the head of the motor for firing the fuel gases, and one which will have the intake and exhaust pipes so formed and placed adjacent as to insure pre-heating of the fuel into gases before it is introduced into the firing chamber, thereby increasing the power, the mileage per gallon, and decreasing any tendency of the fuel or crank case vapors to condense on the cylinder walls and cause crank case dilution.

In the drawings in which I have shown the best and most preferred manner of building my invention Figure 1 is a section longitudinally and vertically through three cylinders of my motor. Figure 2 is a section across one valve and one cylinder. Figure 3 is a plan and section on line 3—3 of Figure 1. Figure 4 is a longitudinal section of the motor showing modifications of the motor. Figure 5 is a cross section of one cylinder of the motor. Figure 6 is a section of one of the pistons. Figure 7 is a section of one cylinder with the piston removed. Figure 8 is a plan view of one of the pistons used in my engine.

In the drawings I have shown the cylinders as A, the pistons as B, the connecting rods as C, and the crank shaft as D.

My cylinders are all alike and each is provided with an annular well 1 around the top near the extreme end thereof said annular well being to catch foreign material to prevent it from draining into the crank case. I then form a spiral groove or channel bleeder 2 from near the lower edge of the well, descending down and around the side wall of the cylinder to the open lower end thereof where any excess oil from the cylinder walls will be accumulated and drained back into the crank case. The cylinders are spaced apart by the usual water jackets 3 and have jackets 4 around the end cylinders to provide for cooling thereof. The pistons of my engine are made with a head 5 which head is bored transversely to receive the connecting rods, C which rods are secured to the crank shaft D, and in the underside of the said piston head 5 above the connecting rod bearings I place a screen 6, which screen is held from the lower side of the head by a flange 7 in the piston, said screen being placed therein to catch the splash of oil from the crank case and prevent accumulation of carbonized oil on the underside of the piston head thereby preventing much of the carbon from finding its way into the oil of the crank case. Around the outer periphery of the top side of the piston I provide or form a cup 8 which cup fits against the sides of the cylinder walls and has the same outside diameter as the head 5 and extends upwardly therefrom, thereby forming the firing chamber of the piston above the head 5 and within the cup 8.

The cylinder head F may be formed in separate portions for each piston or in one compact block as shown in the drawings and each head is formed with water jackets 9 in the top thereof and with extensions E depending downwardly therefrom into the cylinder of the engine but spaced insufficiently from the inner wall of the said cylinder to allow the cup 8 of the piston 5 to operate therebetween. The extension is formed with a downward depending cylinder 10, and an end plate 11, and an upwardly extending cylinder 12, leaving a water jacket 12a therebetween and with a spider 13 formed between the end of the cylinder 12 and the end plate 11 said spider being formed to provide a valve guide 14 therein and ports 15 therebetween through which incoming fuel or exhaust gases are passed. The cylinder 10 is secured to the bottom side 16 of the head F and the cylinder 12 is secured to or formed on the bottom surface of the top side 16a of the head F. Across the cylinder 12 from inner wall to inner wall I provide a separating plate or fin 17 separating the said cylinder into semi-cylindrical intake and exhaust chambers 18 and 19. Through the head of the cylinder extension E and the top side 16a I then pass valve stems 20 which valve stems have heads 21 formed on the lower end thereof, and valve seats 22 are formed in the end plate of the extension head E in open communication with the ports 15, with the heads 21 adapted to seat within and control the flow of fuel or gases through the valve seats and the ports. The valves and stems are controlled by the usual rocker arms G and the cams H and the push rods J of the motor and the rocker-arms open the valves and springs 23 are provided on the top ends of the stems 20 to close the valves in their seats after the rocker arms have been operated. Piston ring grooves 24 are cut in the outer periphery of the extensions E near the lower end thereof and compression rings 25 are carried therein to prevent leakage of compression from the cup 8 up around the walls of the extension E.

The operation of my motor is as follows:—

The pistons 5 operate up and down within the cylinders and the cup 8 operates between the inner walls of the cylinders and the outer walls of the extensions E with the compression rings 25 to prevent leakage of compression from within the cup 8. The spark plugs 27 for firing the fuel gases are set in wells 28 formed in the extensions E and form hot spots in the heads E at the point of explosion. As the pistons move upwardly the gases are compressed within the cup 8 below the extensions E and when they reach the highest point of travel of the piston the spark plugs fire the gases. The compression of the exploded gases is all within the cup 8 and the end of the extensions E and the heads 5 of the pistons and as there are rings in the extensions E there will be complete compression and expansion therewithin. The expanding gases drive the piston 5 down and rotate the crank shaft. This operation is continued in each cylinder. As the cylinder advances the exploded fuel is then exhausted through the exhaust port and the next stroke down of the piston draws new fuel into the chamber in the cup 8. As the piston then advances upwardly this fuel is compressed and as the upward stroke is finished it is fired again driving the piston downward and rotating the crank shaft. The heat generated by the exploded gases is cooled by the fact that the water jacket in the extension E is directly above the firing chamber and is also surrounding the extensions E thereby cooling the cup 8 as it travels up and down the outer surface thereof. The fuel which is drawn into the motor from the carburetor (not shown) is preheated until it is in a vapor form when it enters the top end of the chamber 18 by the close proximity of the exhaust pipe 29 to the intake pipe 30. As shown in Figure 3 of the drawings, the exhaust pipe and the intake pipe are set adjacent and contacting each other with a flat surface therebetween but it will be obvious that they may be made round and a cover or cap set thereover to hold the heat of the exhaust gases adjacent and proximating the intaking fuel thereby giving a hot intake manifold from the carburetor to the engine and down into the firing chamber so that there will be no spot in the travel of the carburetted fuel which will not be heated by the exhaust gases. This insures more finely divided and carburetted fuel in the form of a vapor for the motor thereby giving better consumption of the fuel, more complete carburetion, better mileage and less heat to the motor.

Having thus described my invention I desire to secure by Letters Patent and claim:—

1. In a motor of the class described the combination of a cylinder having an annular well formed near the top end thereof; a bleeder formed spirally down the side wall thereof a detachable cylinder head having an extension thereon adapted to fit down within and spaced from the inner wall of said cylinder; a piston operable within said cylinder having the top end formed into a cup, said cup to operate within the space between the inner walls of the cylinder and the outer walls of the cylinder head; a water jacket formed within the extension on the head around the side walls thereof; a partition between the inner walls of said head extending from top to bottom; valves operable one on each side of said wall, and in valve seats formed on the end of said extension; intake and exhaust pipes adjacent each other to carry fuel to the motor and the exhaust gases therefrom with the exhaust gases to preheat the intake fuel by the close proximity thereto; and a well formed within the extension and through the head in which the spark plug is placed for firing the gases within the cup and below the extension of the head.

2. In a motor of the class described the combination of a cylinder having an annular well formed near the top end thereof; a bleeder formed spirally down the side wall thereof; a detachable cylinder head having an extension thereon adapted to fit down within and spaced from the inner wall of said cylinder; a piston operable within said cylinder having the top end formed into a cup, said cup to operate within the space between the inner walls of the cylinder and the outer walls of the cylinder head; a water jacket formed within the extension on the head around the side walls thereof; a partition between the inner walls of said head extending from top to bottom; valves operable one on each side of said wall, and in valve seats formed on the end of said extension; intake and exhaust pipes adjacent each other to carry fuel to the motor and the exhaust gases therefrom with the exhaust gases to preheat the intake fuel by the close proximity thereto; and means to ignite the fuel in the cup.

3. In a motor of the class described the combination of a set of cylinders having annular wells formed near the top end thereof; a bleeder formed spirally down the inner walls of each cylinder; a detachable cylinder head having extension thereon adapted to fit down within said cylinders to carry the fuel thereto and the gases therefrom and to provide for a water jacket therewithin; a piston having a cup formed on the top end thereof adapted to operate within said cylinder between the walls of the cylinder and the extension on the head; and a screen carried in said piston above the wrist pin, adapted to catch splash oil and prevent carbonization of the oil on the inner head of the piston; and compression rings carried within said extensions to prevent escapement of gases from the cup of the piston into the cylinder.

4. In a motor of the class described the combination of a set of cylinders; a detachable cylinder head having extensions thereon adapted to fit down within said cylinders to carry the fuel thereto and the gases therefrom and to provide for a water jacket therewithin; a piston having a cup formed on the top end thereof adapted to operate within said cylinder between the walls of the cylinder and the extension on the head; and a screen carried in said piston above the wrist pin, adapted to catch splash oil and prevent carbonization of the oil on the inner head of the piston, and compression rings carried within said extensions to prevent escapement of gases from the cup of the piston into the cylinder.

5. In an internal combustion engine having a cylinder with an annular well formed at the head end thereof, the combination of an intake and exhaust manifold formed in a single casting and extending down into said cylinder head to preheat the fuel in the intake manifold by the heat of the exhaust gases within the adjacent exhaust manifold.

In testimony whereof he has affixed his signature.

DOUGLAS F. CLARKE.